United States Patent [19]

Finck et al.

[11] Patent Number: 5,609,805

[45] Date of Patent: Mar. 11, 1997

[54] PROCESS FOR PRODUCING A COMPOSITE PART BY COMPRESSION MOLDING

[75] Inventors: Francois Finck, Deyvillers; Jacques Follanfant, Clermont-Ferrand; Yves Vernet, Cournon-D'Auvergne, all of France

[73] Assignee: Compagnie Generale des Establissements Michelin - Michelin & CIE, Clermont-Ferrand Cedex, France

[21] Appl. No.: 344,662

[22] Filed: Nov. 22, 1994

[30] Foreign Application Priority Data

Nov. 22, 1993 [FR] France ................................. 93/14032

[51] Int. Cl.$^6$ ................................................. B32B 3/26
[52] U.S. Cl. ..................... 264/134; 264/136; 264/137; 264/257; 264/294; 264/328.1; 264/347; 428/361; 428/375; 428/396
[58] Field of Search ............................. 264/294, 328.7, 264/328.1, 257, 271.1, 258, 134, 136, 137, 347; 428/74, 361, 375, 396, 407

[56] References Cited

U.S. PATENT DOCUMENTS

| | | | |
|---|---|---|---|
| 4,207,282 | 6/1980 | Grisch | 264/257 |
| 4,234,633 | 11/1980 | Gowefski et al. | 428/36 |
| 4,302,499 | 11/1981 | Grisch . | |
| 4,681,718 | 7/1987 | Oldham | 264/102 |
| 4,692,291 | 9/1987 | Augell, Jr. | 264/109 |
| 5,041,260 | 8/1991 | Johnson et al. | 264/510 |
| 5,141,689 | 8/1992 | Simonds . | |

FOREIGN PATENT DOCUMENTS 1235561  3/1967  Germany .

OTHER PUBLICATIONS

Database WPI, Derwent Publications Ltd., AN 90 105002, JP-A-02 057 401, Feb. 26, 1990.
Database WPI, Derwent Publications Ltd., AN 87 304356, JP-A-62 215 622, Sep. 22,1987.
Database WPI, Derwent Publications Ltd., AN 88-151541, JP-A-63 092 632, Apr. 23, 1988.

Primary Examiner—Merrick Dixon
Attorney, Agent, or Firm—Oblon, Spivak, McClelland, Maier & Neustadt, P.C.

[57] ABSTRACT

A process for producing a composite part comprising:

(i) putting short reinforcing fibers into a transfer mold;

(ii) impregnation said short reinforcing fibers with a low viscosity resin;

(iii) maintaining said short reinforcing fibers impregnated with by said resin in said transfer mold at a first temperature $T_1$ known as the gelation temperature until a pasty preform is obtained whose viscosity is suitable for compression molding;

(iv) removing said pasty preform from the mold;

(v) placing said pasty preform in a compression mold brought to a second temperature $T_2$, known as the compression temperature, wherein $T_2 > T_1$;

(vi) compression molding said pasty preform; and (vii) polymerizing said pasty preform at at least a third temperature $T_3$ wherein $T_3 \geq T_2$.

7 Claims, 3 Drawing Sheets

PROCESS FOR PRODUCING A COMPOSITE PART BY COMPRESSION MOLDING

BACKGROUND OF THE INVENTION

1. Field of the Invention

The invention relates to a process for producing a composite part, particularly for producing a part of a complex shape and a structural part.

2. Discussion of the Background

A first technique for producing composite parts consists in using a compression molding process. These processes for producing composite parts by compression molding consist of forcing a paste composed of short reinforcing fibers impregnated with resin to fill a compression mold under high pressures. These processes are widely used because of their suitability for the production of parts of complex shapes and because of their great productivity.

The preparation of the paste intended to be molded is a key step in the compression molding production process.

A first paste preparation process consists of performing a thread-by-thread coating of a reinforcing roving with a resin stabilized in an intermediate state. This resin is either in solution in a solvent ("solvent" impregnation) or in the molten state ("hot melt" impregnation). The impregnated roving is then cut into short fibers and stored before being compression molded. However, this process is not applicable to mass production and can create problems of industrial hygiene.

In a second process, the reinforcement and the resin are mixed in a mixer, yielding a paste ready to be molded ("bulk molding compound" or "BMC" technique). However, the impregnation quality is difficult to control, and the reinforcing fibers are often broken during the mixing, which gives rise to mechanical properties that are not always constant. Finally, the fiber volume rates ("FVR") attained are low (about 30%), which does not make it possible to produce structural parts.

A third process consists of depositing cut fibers continuously on a support film, adding resin to them, calendaring the resin and cut fibers between two plastic films and storing it to attain the desired viscosity. The sheets obtained are then cut off and stacked before being compression molded ("sheet molding compound" or "SMC" technique). With this process, again, the impregnation quality is not optimal, and the stacked sheets do not have the theoretical density of the finished product, which requires the removal of a considerable amount of air during molding. Furthermore, the arrangement in sheets leads to problems of rheology during the compression molding.

Another technique for producing composite parts consists of placing reinforcing fibers in a mold (production of a "preform" of the part consisting only of reinforcing fibers with, if necessary, a binder to assure its hold), then injecting into this mold, which is under vacuum and at low pressure, a liquid resin to impregnate the reinforcing fibers. The polymerization of the resin then starts in the mold with optional post-curing after removal of the part from the mold, obtain optimal mechanical properties ("resin transfer molding" or "RTM" process). A mold which makes it possible to inject resin under vacuum and at low pressure is called a "transfer mold".

This process makes it possible to obtain composite parts having excellent mechanical properties due, in particular, to the good impregnation of the reinforcing fiber with the liquid resin. However, this process is not well suited to the production of composite parts of complex shapes because of the difficulty in preplacing the reinforcing fibers quickly and satisfactorily in the transfer mold.

With regard to the prior art, the invention aims to improve the processes for making composite parts of complex shapes, particularly in the case of structural parts.

SUMMARY OF THE INVENTION

The new process for production of a composite part, according to the invention, comprises:

(i) placing reinforcing fibers in a transfer mold;

(ii) impregnation said reinforcing fibers with a low-viscosity resin;

(iii) maintaining said reinforcing fibers impregnated with said resin in said transfer mold, at a first temperature ($T_1$) known as the gelation temperature, until a pasty preform is obtained, whose viscosity is suitable for compression molding;

(iv) removing said pasty preform from said transfer mold;

(v) positioning said pasty preform in a compression mold brought to a temperature ($T_2$) known as the compression temperature, wherein $T_2 > T_1$;

(vi) compression molding said pasty preform;

(vii) polymerizing said pasty preform at at least a third temperature ($T_3$) wherein $T_3 \geq T_2$.

This process has the advantage, compared with the standard processes for the preparation of the paste to be molded, of assuring excellent impregnation of the reinforcing fibers with the liquid resin while assuring proper molding of all the parts of the composite part produced.

In addition, the fiber volume rates obtained by this process can be very high, up to 50%, which offers the possibility of producing structural parts by this technique.

Advantageously, during the injection of the resin, the transfer mold is closed at the height corresponding to the theoretical density of the finished product, i.e., to the volume of the finished product corrected for the density variation that occurs during polymerization. This eliminates the problems connected with the removal of air during compression molding.

The invention also has as its object a resin for producing composite parts comprising a base thermosetting resin and a gelling agent so that at a first temperature, $T_1'$ it has an initial viscosity such that it can be injected under vacuum or at low pressure into a transfer mold to impregnate short reinforcing fibers and attain, under the action of said gelling agent, a viscosity that is suitable for compression molding said reinforcing fibers and said resin, and such that it has a higher polymerization temperature ($T_2'$) than said first temperature ($T_1'$).

BRIEF DESCRIPTION OF THE DRAWINGS

An example of using the process according to the invention will now be described using the following accompanying figures in the case where the reinforcing fibers are glass fibers.

DETAILED DESCRIPTION OF THE PREFERRED EMBODIMENTS

Figure 1:
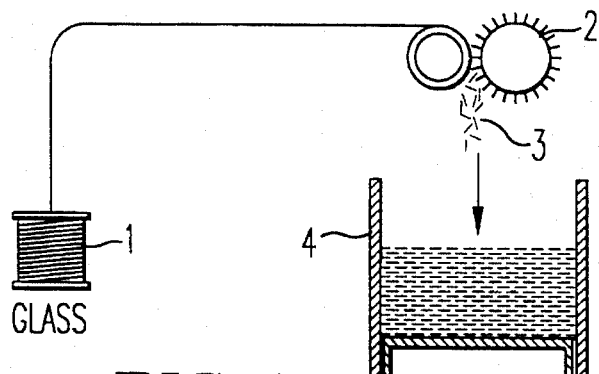
FIG. 1 is a diagram illustrating the cutting and the distribution of the glass fibers in a transfer mold.

The first phase of the process for production of composite parts according to the invention comprises placing the reinforcement in a simple transfer mold 4. Fibers, precut or not, or mats can be used. FIG. 1 exhibits, diagrammatically, the case of the use of a roving 1. A roving of dry glass fibers is cut into short fibers 3 about 25 to 50 mm long with a rotating knife 2 above a simple transfer mold 4, for example cylindrical in shape. If necessary, a device (not shown) changes the relative positions of the knife 2 and of the transfer mold 4 to assure that the transfer mold is evenly filled with the cut fibers.

Suitable reinforcing fibers are those conventionally known and used in the art, including glass, carbon, boron, aramid and mixtures thereof.

Suitable fiber lengths will vary depending on the size of the mold and the application the article will be used for. Typically a fiber length of from 25 to 50 mm is used.

The fiber reinforcement may also be pretreated with a coupling agent to improve the adhesion between the fiber and the resin. Conventional coupling agents are know to those of skill in the art and is selected based on the resin being molded.

Figure 2:
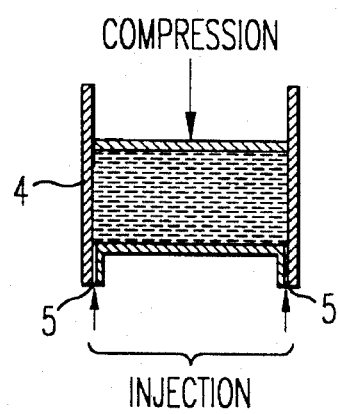
FIG. 2 shows the phase of compacting the fibers and of injection of the resin.
Figure 3:
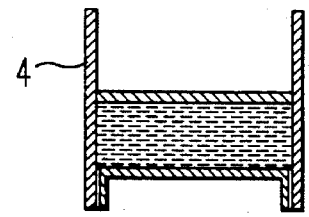
FIG. 3 illustrates the gelation phase of the resin in the transfer mold.

When transfer mold 4 is filled with cut fibers, it is brought to a temperature $T_1$ that is suitable for the injection of the resin. Preferably, the closing of the transfer mold 4 occurs at the height corresponding to the theoretical density of the finished product, which causes a compacting of the fibers 3 (FIG. 2). By "height corresponding to the theoretical density of the finished product" is meant the height corresponding to the volume of the finished product, corrected for the variation in density which occurs during the polymerization.

Then the resin is injected through channels 5. The resin preferably has a viscosity less than or equal to 100 centipoise (0.1 Pa.s) more preferably less than or equal to 80 centipoise. The unit is kept, after the end of the injection, in the transfer mold 4 for a time $t_m$ such that the resin gels until its viscosity becomes suitable for compression molding. The viscosity suitable for compression molding is determined experimentally for the particular resin used by a needle penetrometer (Standard ASTM D5: A87 073.10 and A87 081.00). The penetration of the needle into the pure resin, measured at this temperature $T_1$, is preferably between 10.5 and 17.5 millimeters. The measurement of penetrability is made on the "pure resin," i.e., in the absence of any reinforcing fiber.

Figure 4:
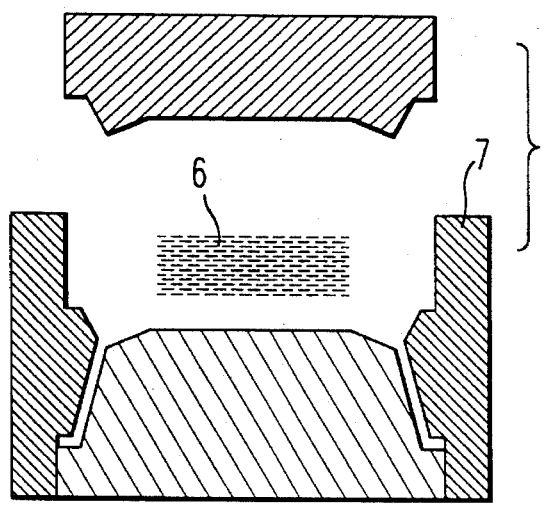
FIG. 4 exhibits the removal of the pasty preform from the mold and the charging of the compression mold.

At the end of time $t_m$, pasty preform 6 obtained is removed from the mold and is transferred into a compression mold 7 brought to a temperature $T_2$ suitable for molding and for starting the polymerization reaction of the resin (FIG. 4).

Figure 5:
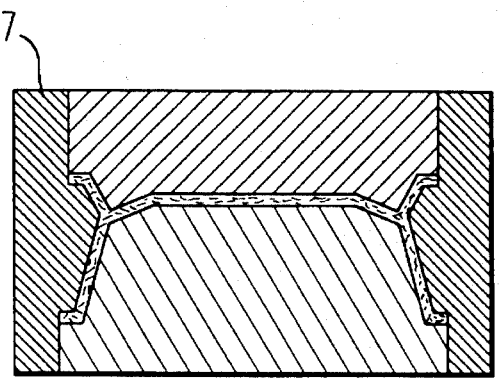
FIG. 5 is a diagram illustrating the phases of molding and of polymerization.

The molding of pasty preform 6 is performed in compression mold 7 (FIG. 5). At the end of the molding, the polymerization of the resin is achieved at one or more temperatures, in compression mold 7 and in a post-curing oven after removal from the mold.

The invention is also directed to a resin which at a temperature $T_1'$ has a low enough viscosity to be injected under vacuum or at low pressure into a transfer mold 4, then is gradually gelled until its viscosity attains a value suitable for a compression molding and which at a temperature $T_2'$, which is higher than $T_1'$, starts its polymerization reaction.

Such a resin comprises a thermosetting base resin and at least one gelling and/or polymerization agent.

A suitable viscosity for injecting under vacuum is $\leq 100$ centipoise (0.1 Pa.s).

Preferably, the base resin is selected from the group consisting of epoxy, vinylester, polyester, bismaleimide, polyurethane, polyurea, phenolic resin and a mixture thereof.

A conventional gelling agent can be an isocyanate at a ratio of 10 to 40 parts preferably 25–35 parts per 100 parts of base resin.

The polymerization agent is a thermally activated radical initiator, such as a peroxide, or azo initiator, at a ratio of 0.2 to 2.0 parts, preferably from 0.4 to 1.0 parts per 100 parts of base resin.

An example of such a suitable resin has the following formula:

Vinylester resin with a phenolic base—100 parts, (Derakane 470/36 (Dow Chemicals))

MDI Isocyanate (Isonate M143)—32"

Peroxide (tert-butyl perbenzoate)—0.5"

Figure 6:
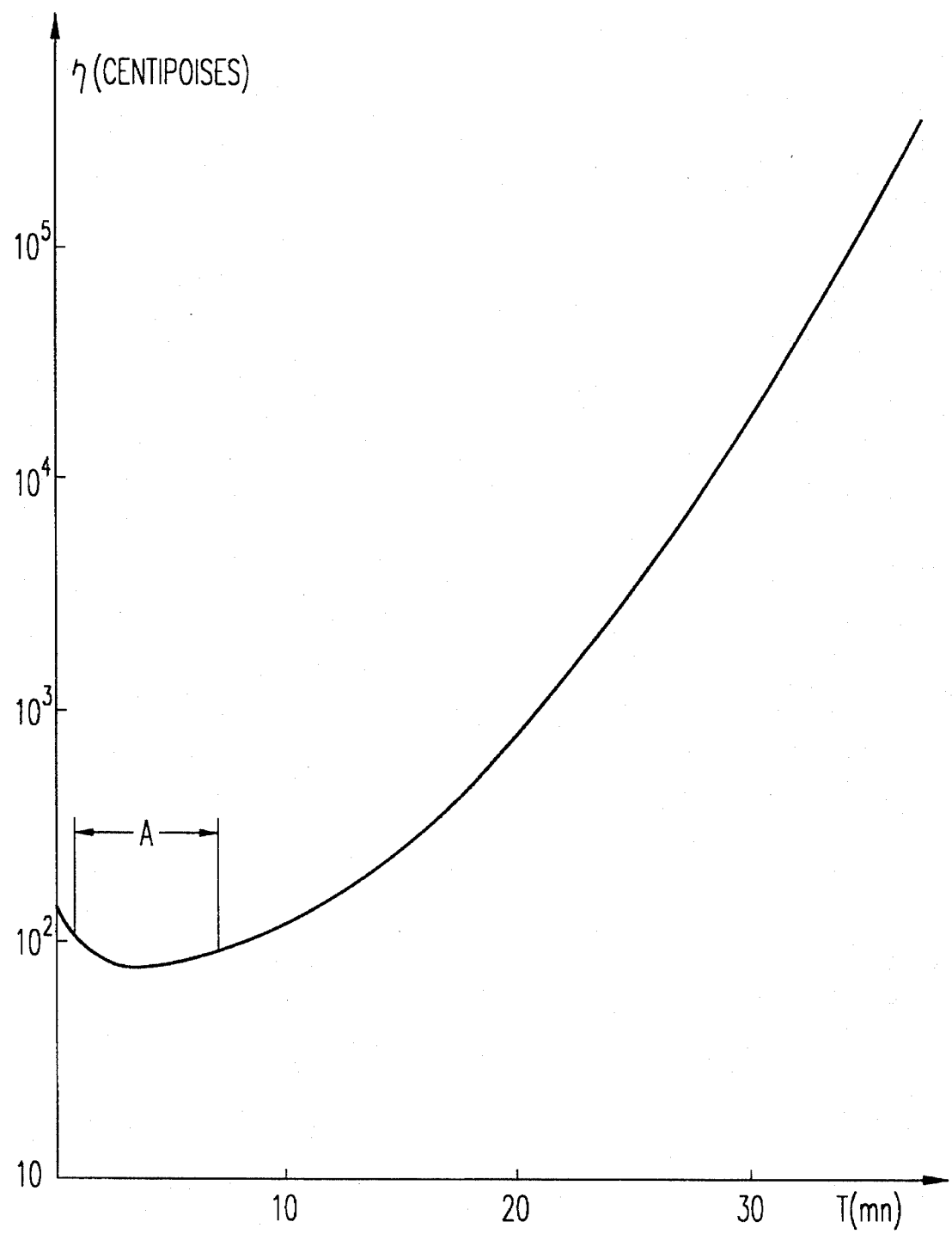
FIG. 6 shows the change in viscosity as a function of time, in min, at 50° C. of a resin.

The change in the viscosity η (in centipoise) of this resin as a function of time t (in minutes) at 50° C. is presented in FIG. 6. Between 2 and 7 minutes—zone A in FIG. 6—after having been brought to 50° C., the viscosity of this resin is less than or equal to 100 centipoise (0.1 Pa.s) which is entirely satisfactory for good injection into a transfer mold 4. Beyond 7 minutes, under the action of the isocyanate, viscosity increases continually until it exceeds 105 centipoise (0.105 Pa.s).

Figure 7:
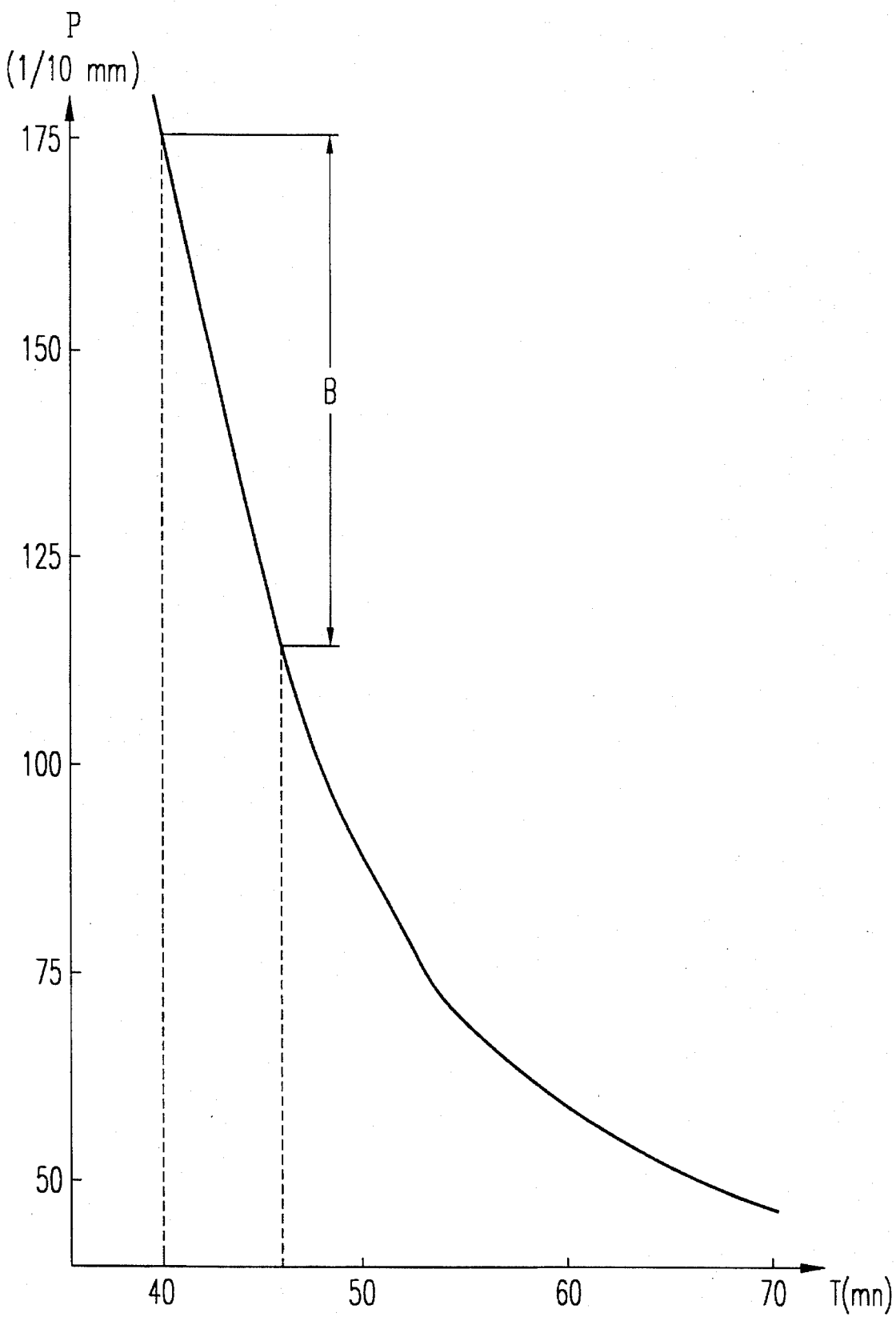
FIG. 7 depicts the change in penetrability as a function of time, in min, at 50° C. of the same resin.

To be able to determine the moment when the viscosity is suitable for compression molding, a needle penetrometer (Standard ASTM D5: A87 073.10 and A87 081.00) is experimentally used. FIG. 7 presents the change as a function of time t (in minutes), still at 50° C., of the penetration P (in millimeters) of the needle of the penetrometer in the pure resin. It was determined experimentally that compression molding was satisfactory for penetration values between 10.5 and 17.5 millimeters. This makes it possible to define the standing time of the resin in the transfer mold—zone B in FIG. 7—between 40 and 46 minutes.

The reinforcing fibers impregnated with resin are then molded in compression mold 7 brought to 115° C. The polymerization associated with the action of the tert-butyl perbenzoate starts. At the end of 20 minutes at this temperature of 115° C., it is possible to remove the part from the mold. Post-curing in an oven for 4 hours at 150° C. and 1 hour at 200° C. is then desirable to achieve the polymerization and crosslinking of the resin.

Of course, the resin according to the invention can further comprise additives, which may or may not participate in the gelling and polymerization reactions, such as thermoplastic resins, surfactants, plasticizers, anti-shrinking, internal mold-release agent, protective agents, coloring agents.

This process for production of composite parts by compression molding makes it possible to reach very high fiber volume rates, up to 50%, which offers the possibility of producing structural parts by this technique. In particular, this process is well suited to the production of wheel elements of composite material for vehicles.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for producing a composite part of a complex shape comprising:

(i) placing reinforcing fibers into a transfer mold;

(ii) impregnating said reinforcing fibers with a low viscosity resin to obtain an impregnated preform;

(iii) maintaining said impregnated preform in said transfer mold, at a first temperature $T_1$ until said impregnated preform becomes a pasty preform suitable for compression molding;

(iv) placing said pasty preform in a compression mold adapted to the complex shape of said composite part at a temperature $T_2$, wherein $T_2 > T_1$;

(v) compression molding said pasty preform to the complex shape of said composite part;

(vi) polymerizing said resin of said pasty preform at, at least, a third temperature $T_3$, wherein $T_3 \geq T_2$ to obtain said composite part.

2. The process of claim 1, wherein said composite part has a theoretical density and said transfer mold is closed at a height corresponding to said theoretical density, during impregnating step (ii).

3. The process of claim 1, wherein, said low viscosity resin has a viscosity $\leq$ 100 centipoise.

4. The process of claim 1, wherein the viscosity of said pasty preform of step (iii) is such that the penetration of a penetrometer needle into a pure resin identical to said low viscosity resin in the absence of reinforcing fibers is between 10.5 and 17.5 millimeters.

5. The process of claim 1, further comprising polymerizing said resin outside of said compression mold, after step (vi).

6. The process of claim 1 wherein $T_3 = T_2$.

7. The process of claim 1 wherein $T_3 > T_2$.

* * * * *